United States Patent
Hwang et al.

(10) Patent No.: US 7,415,040 B1
(45) Date of Patent: Aug. 19, 2008

(54) METHOD FOR TRANSMITTING SIGNALS IN MOBILE COMMUNICATION SYSTEM

(75) Inventors: In Tae Hwang, Kyonggi-do (KR); Sang Rim Shin, Kyonggi-do (KR); Myoung Jin Ok, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/406,729

(22) Filed: Sep. 28, 1999

(30) Foreign Application Priority Data

Oct. 1, 1998 (KR) .................................. 98-041482

(51) Int. Cl.
| | |
|---|---|
| H04L 5/00 | (2006.01) |
| H04J 13/00 | (2006.01) |
| H04J 3/00 | (2006.01) |
| H04J 1/00 | (2006.01) |
| H04Q 1/00 | (2006.01) |

(52) U.S. Cl. .................. 370/469; 370/347; 370/349; 370/437; 370/478; 370/479; 455/452.1

(58) Field of Classification Search ...... 370/310–310.2, 370/313, 328, 332, 334, 335, 338, 342–345, 370/245, 464, 465, 469, 477–480, 337, 347, 370/349, 437; 455/452.1

See application file for complete search history.

(56) References Cited

U.S. PATENT DOCUMENTS

| | | | | |
|---|---|---|---|---|
| 5,381,444 | A * | 1/1995 | Tajima ..................... | 455/67.16 |
| 5,638,371 | A * | 6/1997 | Raychaudhuri et al. .. | 370/310.2 |
| 5,774,461 | A * | 6/1998 | Hyden et al. ............. | 370/310.2 |
| 5,787,080 | A * | 7/1998 | Hulyalkar et al. ........ | 370/310.2 |
| 5,845,215 | A * | 12/1998 | Henry et al. ............. | 455/426.1 |
| 5,936,949 | A * | 8/1999 | Pasternak et al. ........... | 370/328 |
| 5,953,328 | A * | 9/1999 | Kim et al. ................... | 370/337 |
| 5,958,018 | A * | 9/1999 | Eng et al. .................... | 370/338 |
| 6,307,867 | B1 * | 10/2001 | Roobol et al. ............... | 370/470 |
| 6,363,058 | B1 * | 3/2002 | Roobol et al. ............... | 370/310 |
| 6,374,112 | B1 * | 4/2002 | Widegren et al. ......... | 455/452.2 |

(Continued)

FOREIGN PATENT DOCUMENTS

EP    0 482 773 A1    4/1992

OTHER PUBLICATIONS

WCDMA—The Radio Interface for Future Mobile Multimedia Communications, Erik Dahlman et al, IEEE Transactions on Vehicular Technology, vol. 47, No. 4, Nov. 1998.*

(Continued)

*Primary Examiner*—Chi H. Pham
*Assistant Examiner*—Ahmed Elallam
(74) *Attorney, Agent, or Firm*—Ked & Associates, LLP

(57) ABSTRACT

A method for transmitting a signal of a medium access control sublayer in a mobile communication system which has mobile and base stations for providing a bearer service. A bearer service profile type is decided according to a bearer service combination type of the bearer service for the provision of the bearer service. A transport format indicator is set according to the decided bearer service profile type, and a transport format combination indicator is appended to a dedicated physical control channel. The most efficient data is transmitted on the basis of a service type and a measured radio environment result. Therefore, a data frame format most suitable to a channel environment can be produced, thereby providing the best service.

4 Claims, 2 Drawing Sheets

U.S. PATENT DOCUMENTS 6,608,832 B2 * 8/2003 Forslow ............... 370/353
6,831,909 B1 * 12/2004 Koo et al. ............... 370/339
2005/0083876 A1 * 4/2005 Vialen et al. ............... 370/328

OTHER PUBLICATIONS

Erik Dahlam et al., UMTS/IMT-2000 Based on Wideband CDMA, Sep. 1998, pp. 70-80, IEEE Communications Magazine, XP-000784828.

Christiaan Roobol et al., A Proposal for an RLC/MAC Protocol for Wideband CDMA Capable of Handling Real Time and Non Real Time Services, pp. 107-111, 1998 IEEE Communications.

Eero Nikula et al., Frames Multiple Access for UMTS and IMT-2000, pp. 16-20, IEEE Personal Communications, Apr. 1998, XP-000751831.

Ojanpera, Tero, et al., (Editor) "Wideband CDMA for Third Generation Mobile Communications," 1998, Artech House, Boston and London.

Ojanpera, Tero, et al, "An Overview of Air Interface Multiple Access for IMT-2000/UMTS," IEEE Communications Magazine, Sep. 1998, pp. 82-95.

Dahlman, Erik, et al., "UMTS/IMT-2000 Based on Wideband CDMA," IEEE Communications Magazine, Sep. 1998, pp. 70-80. (XP 000784828).

Tdoc SMG2-L23 2Y99-67, TSG-RAN WG2 1999, Espoo, Finland, Jan. 18-20, 1999, UMTS 25.xx v.0.1.2 Technical Report, Universal Mobile Telecommunications System (UMTS); Vocabulary for the UTRAN (UMTS 25.xx version 0.1.3).

"Concept Group Alpha—Wideband Direct-Sequence CDMA (WCDMA) Evaluation Document (3.0), Part 3: Detailed simulation results and parameter," ETSI SMG Meeting No. 24, Madrid, Spain, Dec. 15-19, 1997.

TR 101 112 v3.2.0 (Apr. 1998), Universal Mobile Telecommunications System (UMTS); Selection Procedures for the Choice of Radio Transmission Technologies of the UMTS (UMTS 30.03 version 3.2.0).

3GPP RAN S2.02 v0.0.1, Jan. 1999, "Services Provided by the Physical Layer," 3GPP TSG RAN WG2 #1, Jan. 20-22, 1999, Helsinki, Finland.

"3rd Generation Partnership Project (3GPP); Technical Specification Group (TSG) RAN; Working Group 2 (WG2); Services Provided by the Physical Layer," TS 25.302 v2.0.0 (Apr. 1999).

* cited by examiner

METHOD FOR TRANSMITTING SIGNALS IN MOBILE COMMUNICATION SYSTEM

BACKGROUND OF THE INVENTION

1. Field of the Invention

The present invention relates in general to a mobile communication system, and more particularly to a method for transmitting a signal of a medium access control (referred to hereinafter as MAC) sublayer in a mobile communication system.

2. Description of the Prior Art

Various methods have been proposed to transmit signals in a mobile communication system. One such conventional signal transmission method may be a data frame-type method which varies a data rate according to a service type.

However, the above-mentioned conventional signal transmission method has a disadvantage in that it cannot transmit efficient data because it varies the data rate according to the service type without regarding environmental factors.

SUMMARY OF THE INVENTION

Therefore, the present invention has been made in view of the above problem, and it is an object of the present invention to provide a method for transmitting a signal of a MAC sublayer in a mobile communication system, in which the most efficient data is transmitted on the basis of a service type and a measured radio environment result.

In accordance with one aspect of the present invention, the above and other objects can be accomplished by a provision of a method for transmitting a signal of a medium access control sublayer in a mobile communication system which has mobile and base stations for providing a bearer service, comprising the first step of deciding a bearer service profile type according to a bearer service combination type of the bearer service to provide the bearer service; and the second step of setting a transport format indicator according to the decided bearer service profile type and appending a transport format combination indicator to a dedicated physical control channel.

In accordance with another aspect of the present invention, there is provided a method for transmitting a signal of a medium access control sublayer in a mobile communication system which has mobile and base stations for providing a bearer service, comprising the first step of allowing an application layer to decide a bearer service combination type of the bearer service; the second step of allowing a radio resource control layer to measure a radio environment between the mobile and base stations; the third step of allowing the radio resource control layer to decide a bearer service profile type according to the decided bearer service combination type and the measured radio environment result and then assign a transport format combination set; the fourth step of allowing the medium access control sublayer to select appropriate transport formats within the assigned transport format combination set; and the fifth step of allowing a specific layer to set attributes of a dynamic part and semi-static part of the selected transport formats and append a transport format combination indicator to a dedicated physical control channel.

In a feature of the present invention, the most efficient data is transmitted on the basis of a service type and a measured radio environment result. Therefore, a data frame format most suitable to a channel environment can be produced, thereby providing the best service.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Figure 1A:
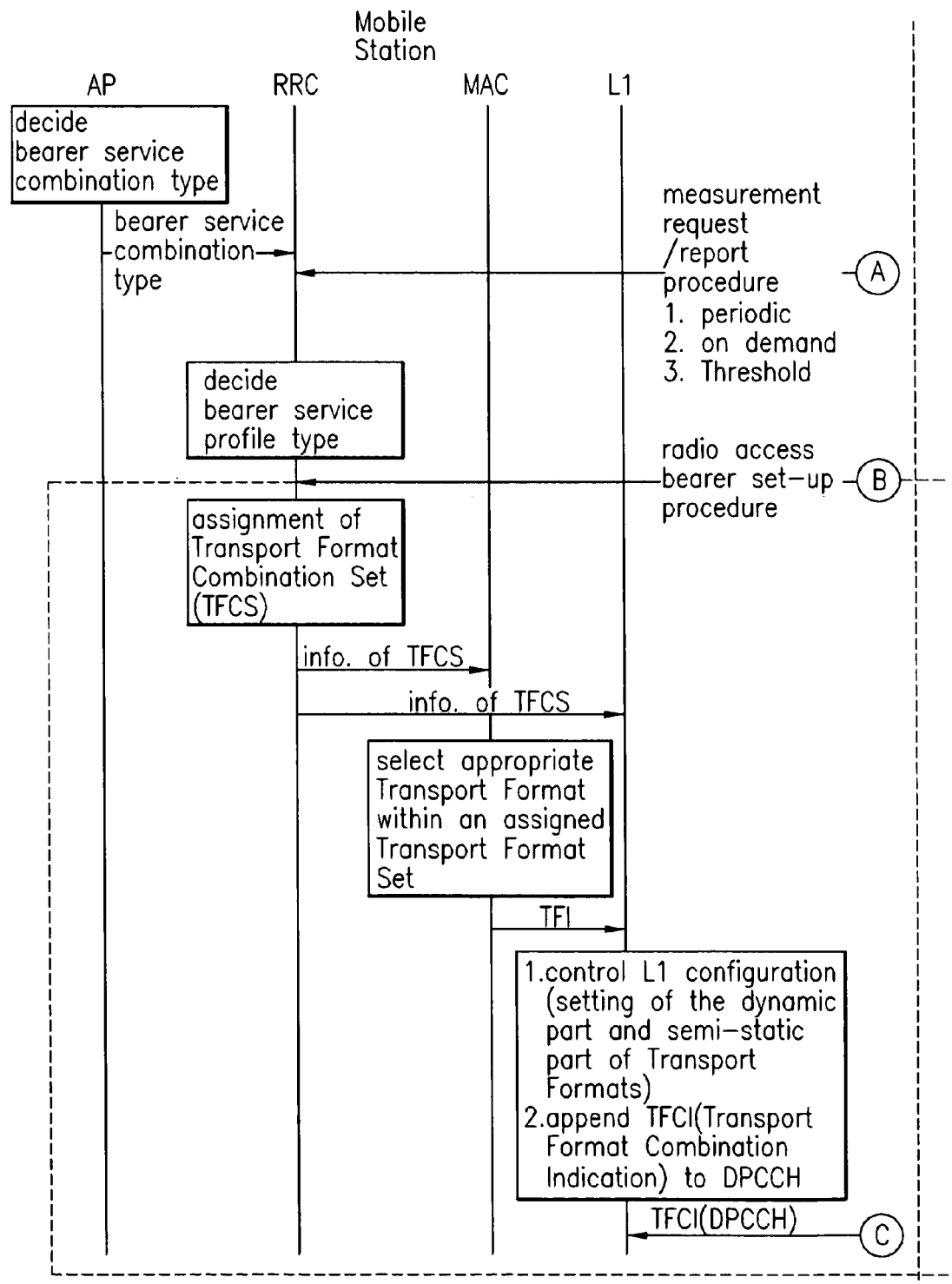
FIGS. 1a and 1b are flowcharts illustrating a method for transmitting a signal of a MAC sublayer in a mobile communication system in accordance with the preferred embodiment of the present invention.
Figure 1B:
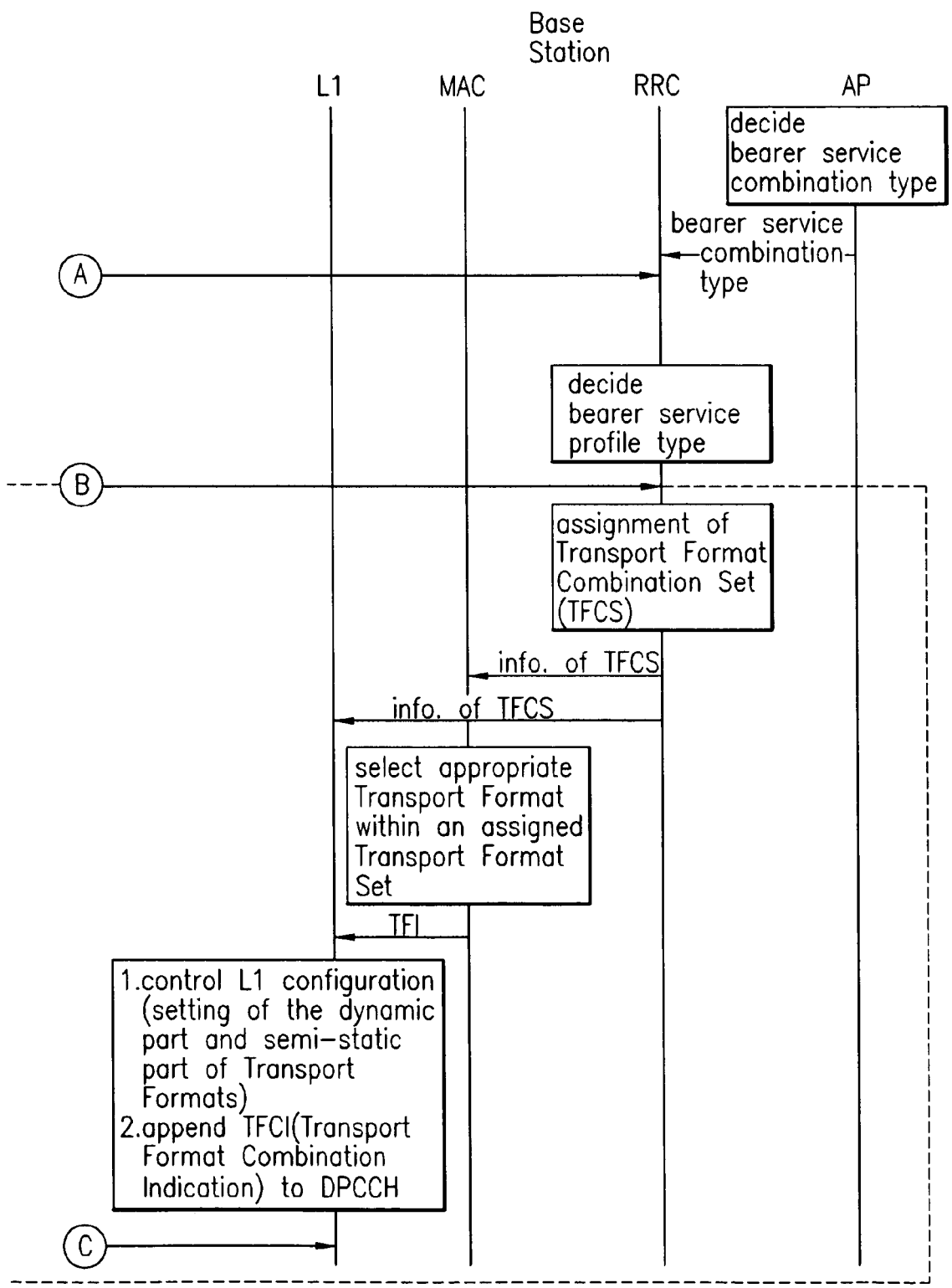

FIGS. 1a and 1b are flowcharts illustrating a method for transmitting a signal of a MAC sublayer in a mobile communication system in accordance with the preferred embodiment of the present invention.

A base station provides simultaneous parallel data services. Different services have independent bit rates, bit error rates, degrees of transparency, throughputs, packets and circuit-switched transfer modes, respectively.

There may be about three different service types in three different environments. The three different service types are generally bearer service types with combinations of speech, circuit data and packet data services. The present invention includes a transport format indicator/transport format combination indicator (referred to hereinafter respectively as TFI/TFCI) concept related to bearer services and environments.

Now, a detailed description will be given of the coupling between TFI/TFCI values and a service profile type in communication based on the signal transmission method of the present invention with reference to FIGS. 1a and 1b.

As shown in FIG. 1a, first, an application (referred to hereinafter as AP) layer of a mobile station decides a bearer service combination type to provide a bearer service based on a service profile type and outputs information regarding the decided bearer service combination type to a radio resource control (referred to hereinafter as RRC) layer.

The service profile type includes bearer service combination, bearer service class and environment items. The TFI/TFCI values are in close connection with the service profile type.

The bearer service combination type includes a bearer service category defined by a combination of speech, circuit data and packet data services. The bearer service category includes any one of only the speech service, only the circuit data service, only the packet data service, a combination of simultaneous speech and packet data services, a combination of simultaneous speech and circuit data services, a combination of simultaneous packet data and circuit data services and a combination of simultaneous speech, packet data and circuit data services.

The bearer service class type is classified into four classes A, B, C and D according to a bit rate and a quality of service.

The class A has connection oriented and delay constrained characteristics for low delay data, and is further classified into three types.

The first type of the class A has 8 kbps peak data rate, 20 ms delay and bit error rate (BER)<$10^{-3}$ characteristics, the second type has 144 kbps peak data rate, 50 ms delay and BER<$10^{-6}$ characteristics and the third type has 384 kbps peak data rate, 50 ms delay and BER<$10^{-3}$ characteristics.

The class B has variable bit rate, connection oriented and delay constrained characteristics for low delay data at a variable bit rate, and is further classified into four types.

The first type of the class B has 64 kbps peak data rate, 50 ms delay, BER<$10^{-6}$ and 16 kbps granuality characteristics, the second type has 144 kbps peak data rate, 50 ms delay, BER<$10^{-6}$ and 16 kbps granuality characteristics, the third type has 384 kbps peak data rate, 50 ms delay, BER<$10^{-6}$ and 16 kbps granuality characteristics, and the fourth type has 2048 kbps peak data rate, 50 ms delay, BER<$10^{-6}$ and 32 kbps granuality characteristics.

The class C has connection oriented and delay constrained characteristics for long constrained delay data, and is further classified into four types.

The first type of the class C has 64 kbps peak data rate, 300 ms delay, BER<$10^{-6}$ and 16 kbps granuality characteristics, the second type has 144 kbps peak data rate, 300 ms delay, BER<$10^{-6}$ and 16 kbps granuality characteristics, the third type has 384 kbps peak data rate, 300 ms delay, BER<$10^{-6}$ and 16 kbps granuality characteristics, and the fourth type has 2048 kbps peak data rate, 300 ms delay, BER<$10^{-6}$ and 32 kbps granuality characteristics.

The class D has connectless and delay unconstrained characteristics for unconstrained delay data, and is further classified into four types.

The first type of the class D has 64 kbps peak data rate, unconstrained delay and BER<$10^{-8}$ characteristics, the second type has 144 kbps peak data rate, unconstrained delay and BER<$10^{-8}$ characteristics, the third type has 384 kbps peak data rate, unconstrained delay and BER<$10^{-8}$ characteristics and the fourth type has 2048 kbps peak data rate, unconstrained delay and BER<$10^{-8}$ characteristics.

Then, upon the information regarding the decided bearer service combination type from the AP layer, the RRC layer of the mobile station performs a measurement request/report procedure with an RRC layer of a base station. In the measurement request/report procedure, periodic, on-demand and threshold information are obtained and a radio environment is measured on the basis of the obtained information. The RRC layer of the mobile station decides a bearer service profile type according to the bearer service combination type decided by the AP layer and the measured radio environment result and then performs a radio access bearer set-up procedure with the RRC layer of the base station.

The measured radio environment result may generally be classified into three models according to the obtained periodic, on-demand and threshold information, or an indoor environment model, an outdoor to indoor and pedestrian environment model and a vehicular environment model. The base station economically operates these three environment models.

In the radio access bearer set-up procedure, after deciding the bearer service profile type, the RRC layer of the mobile station assigns a transport format combination set and transfers information of the assigned transport format combination set to a MAC sublayer and layer 1 L1 of the mobile station.

Then, the MAC sublayer of the mobile station selects appropriate transport formats within a transport format set assigned according to the transport format combination set assigned by the RRC layer and transfers a transport format indicator to the layer 1 L1.

The layer 1 L1 of the mobile station controls a configuration thereof according to the transport format combination set assigned by the RRC layer and the transport format indicator transferred by the MAC sublayer.

The L1 configuration control is performed by setting attributes of a dynamic part and semi-static part of the selected transport formats according to the transport format combination set assigned by the RRC layer and the transport format indicator transferred by the MAC sublayer.

The dynamic part attributes include a transport block size and transport block setup size.

The semi-static part attributes include a transport time interval, a type of channel coding, outer coding such as Reed-Solomon coding, outer interleaving, inner coding, inner interleaving and rate matching.

The outer interleaving attribute represents the depth of outer interleaving in a radio frame and the inner interleaving attribute represents the depth of inner interleaving in the radio frame.

Further, the layer 1 L1 of the mobile station appends a transport format combination indicator to a dedicated physical control channel (DPCCH) according to the transport format combination set assigned by the RRC layer and the transport format indicator transferred by the MAC sublayer.

The transport format combination indicator is asymmetrically assigned between the mobile station and the base station.

A layer 1 L1, MAC sublayer, RRC layer and AP layer of the base station perform the same operations as those in the mobile station, respectively, as shown in FIG. 1b, to provide the bearer service, and a description thereof will thus be omitted.

As apparent from the above description, according to the present invention, the most efficient data is transmitted on the basis of a service type and a measured radio environment result. Therefore, the present invention has the effect of producing a data frame format most suitable to a channel environment so as to provide the best service.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of data processing at a transmitting side having a radio resource control (RRC) layer, a medium access control (MAC) layer, and a physical (PHY) layer for establishing transport formats to efficiently transmit data to a receiving side, the method comprising:

assigning, at the radio resource control (RRC) layer, a transport format combination set (TFCS) to the medium access control (MAC) layer;

selecting at the MAC layer transport formats within said assigned transport format combination set (TFCS);

transferring transport format indicators corresponding to the selected transport formats from the MAC layer to the physical (PHY) layer; and transmitting at the physical (PHY) layer, a transport format combination indicator on a dedicated physical control channel (DPCCH) to the receiving side, wherein the transport format combination indicator (TFCI) is appended to the dedicated physical control channel (DPCCH) based on the transport format indicators transferred by the MAC layer.

2. The method of claim 1, further comprising setting, at the physical (PHY) layer, attributes of a dynamic part and semi-static part of the selected transport formats.

3. The method of claim 2, wherein the attributes of a dynamic part include a transport block size and a transport block set size.

4. The method of claim 2, wherein the attributes of the semi-static part include at least one of a transport time interval, a type of channel coding, outer coding, and rate matching.

* * * * *